(12) United States Patent
Gill et al.

(10) Patent No.: US 7,909,705 B2
(45) Date of Patent: Mar. 22, 2011

(54) VARIABLE MASS GRIP (75) Inventors: David Keith Gill, Pinehurst, NC (US); William Wendell Andersen, Hope Mills, NC (US); Donald Lawrence Murdock, Ellerbe, NC (US); Bruce John Norton, Laurinburg, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/148,238

(22) Filed: Apr. 17, 2008

(65) Prior Publication Data
US 2010/0304882 A1 Dec. 2, 2010

Related U.S. Application Data (62) Division of application No. 11/607,707, filed on Dec. 1, 2006, now Pat. No. 7,399,235.

(51) Int. Cl.
A63B 53/16 (2006.01)
(52) U.S. Cl. ........................ 473/297; 473/300
(58) Field of Classification Search ............ 473/300–33, 473/297, 549–568; D21/756; D08/DIG. 6, D08/DIG. 7, DIG. 8; 74/551.9; 81/492; 16/DIG. 12, DIG. 24, 430; 280/821
See application file for complete search history.

(56) References Cited

U.S. PATENT DOCUMENTS

| | | | |
|---|---|---|---|
| 1,210,182 A | 12/1916 | Lynch | |
| 1,831,255 A | 11/1931 | Menzies | |
| 2,091,458 A * | 8/1937 | Sleight | 16/421 |
| 2,992,828 A | 6/1956 | Stewart | 273/80 |
| 3,606,327 A | 9/1971 | Gordon | 273/81 A |
| 3,727,295 A * | 4/1973 | Gildemeister | 29/455.1 |
| 4,379,097 A * | 4/1983 | Leggett | 261/78.2 |
| 4,674,746 A | 6/1987 | Benoit | 273/81 |
| 4,936,586 A | 6/1990 | Van Raemdonck | 273/73 |
| 5,145,171 A | 9/1992 | Head et al. | 473/300 |
| 5,322,290 A | 6/1994 | Minami | 473/201 |
| 5,330,193 A | 7/1994 | Ijiri | 273/193 |
| 5,362,046 A | 11/1994 | Sims | 273/73 |
| 5,465,967 A | 11/1995 | Boeckenhaupt | 273/162 |
| 5,540,625 A | 7/1996 | Koch et al. | 473/318 |
| 5,735,752 A | 4/1998 | Antonious | 473/317 |
| 5,766,088 A | 6/1998 | Severtsen | 473/297 |
| 5,842,933 A | 12/1998 | Lewis | 473/300 |

(Continued)

FOREIGN PATENT DOCUMENTS
EP 0 227 347 B1 7/1987
(Continued)

OTHER PUBLICATIONS
U.S. Appl. No. 11/619,744, filed Jan. 4, 2007.
(Continued)

*Primary Examiner* — Stephen L. Blau
(74) *Attorney, Agent, or Firm* — Daniel S. Kalka (57) ABSTRACT A variable mass cap 20 for a shock imparting implement grip has a butt element 22 connected to a tubular portion 24 constructed to receive a selected mass 26, 28. The tubular portion 24 fits snugly within a recess 34 of a body 32, and is retained therein by the engagement of an annular ridge 36 with a first annular groove 30 disposed in an outer surface of the tubular portion 24. In an alternate embodiment, threaded portion 31 is received by and engaged by a corresponding threaded recess 34. The cap 20 is mechanically secured to the body 32 for providing a grip with a variable mass.

5 Claims, 7 Drawing Sheets

U.S. PATENT DOCUMENTS

| | | | |
|---|---|---|---|
| 5,851,632 A | 12/1998 | Chen et al. | 428/156 |
| 5,855,525 A | 1/1999 | Turner | 473/300 |
| 5,983,747 A * | 11/1999 | Chen | 74/551.9 |
| 6,022,281 A * | 2/2000 | Nolan | 473/457 |
| 6,354,958 B1 | 3/2002 | Meyer | 473/297 |
| 6,506,128 B1 | 1/2003 | Bloom, Jr. | 473/292 |
| 6,626,768 B2 | 9/2003 | Roelke | 473/296 |
| 6,656,054 B2 | 12/2003 | Ulrich | 473/201 |
| RE38,983 E | 2/2006 | Antonious | 473/317 |
| 7,048,644 B2 | 5/2006 | Wang | 473/300 |
| D536,048 S | 1/2007 | Chen | D21/756 |
| 7,458,902 B2 * | 12/2008 | Gill | 473/299 |
| 2002/0173371 A1 | 11/2002 | Lamkin et al. | |
| 2003/0045370 A1 * | 3/2003 | Jaw | 473/302 |
| 2003/0157990 A1 | 8/2003 | Bloom, Jr. | |
| 2005/0202908 A1 * | 9/2005 | Haynes | 473/564 |

FOREIGN PATENT DOCUMENTS

| | | |
|---|---|---|
| GB | 2 315 418 A | 4/1998 |
| WO | WO 03-066173 A1 | 8/2003 |

OTHER PUBLICATIONS

U.S. Appl. No. 11/619,739, filed Jan. 4, 2007.
U.S. Appl. No. 11/607,707, filed Dec. 1, 2006.
U.S. Appl. No. 11/655,462, filed Jan. 19, 2007.
U.S. Appl. No. 11/724,062, filed Mar. 14, 2007.
U.S. Appl. No. 11/449,108, filed Jun. 8, 2006.

* cited by examiner

VARIABLE MASS GRIP

This application is a divisional application of patent application Ser. No. 11/607,707 filed on Dec. 1, 2006 now U.S. Pat. No. 7,399,235.

FIELD

The present disclosure relates in general to a hand grip or a sports grip, and more particularly to a new and improved variable mass grip particularly suited as a grip for shock imparting implements.

BACKGROUND

There are many forms of grips available on the market today for a wide variety of implements. These implements can range from hammer handles or other hand tools to sports implements like tennis, squash, or racquetball rackets, or golf clubs. While the present invention is particularly suited as a golf club grip and described with reference thereto, it should be immediately apparent that the present invention is not intended to be limited only to golf grips and extends to any sports grip or hand grip for a shock imparting implement.

Originally, golf club grips consisted primarily of a leather wrap around a handle. Later, molded rubber grips became available and are still in wide use today. A recent variation on the molded rubber grip is the concept of using a rubber sleeve or underlisting on the handle with leather or synthetic leather wrap spirally wrapped around the underlisting for a softer hand feel. Grips are made today from a wide variety and combination of materials.

There still exists a need for an improved variable mass grip that imparts or receives shock or force to or from a shock imparting implement that can provide vibration dampening. The grip should provide a firm grasp with little or no slippage, good resistance to torque as well as good shock absorbing qualities. At the same time there is a need to enhance the swing weight control of the implement for a more effective control with that implement. Swing weight control, handle stiffness, flex control, shock absorption are just some of the important factors in improving the impact from the implement. The concept of tailoring a variable mass to the grip provides a user with multiple options on improving one's game in sports, or making work easier with a tool that handles and performs better.

Thus, it is desirable to have a variable mass grip that allows the user to select the right fit and feel for the handle or shaft of a shock imparting implement or tool to meet the needs of the user in a given application.

BRIEF SUMMARY OF THE DISCLOSURE

The present disclosure describes an improved cap for a variable mass grip.

The cap includes a substantially cylindrical element on one end that forms an upper portion of the cap. A tubular portion connected to one side of the cylindrical element tapers in a direction away from the cylindrical element. The tubular portion has a first annular groove on its outer surface near the cylindrical element, and a second annular groove on its inner surface near the first annular groove. The tubular portion is constructed to receive a selected mass, and to be positioned within a hollow body sized and shaped to fit on a handle of an implement. The present disclosure further describes how the improved variable mass cap produces cost savings in manufacturing and styles for grips as well as reduced inventory expenses.

The various features of novelty which characterize the present disclosure are pointed out with particularity in the claims annexed to and forming a part of this disclosure. For a better understanding and its operating advantages attained with its use, reference is made to the accompanying drawings, and descriptive matter.

DETAILED DESCRIPTION

Figure 1:
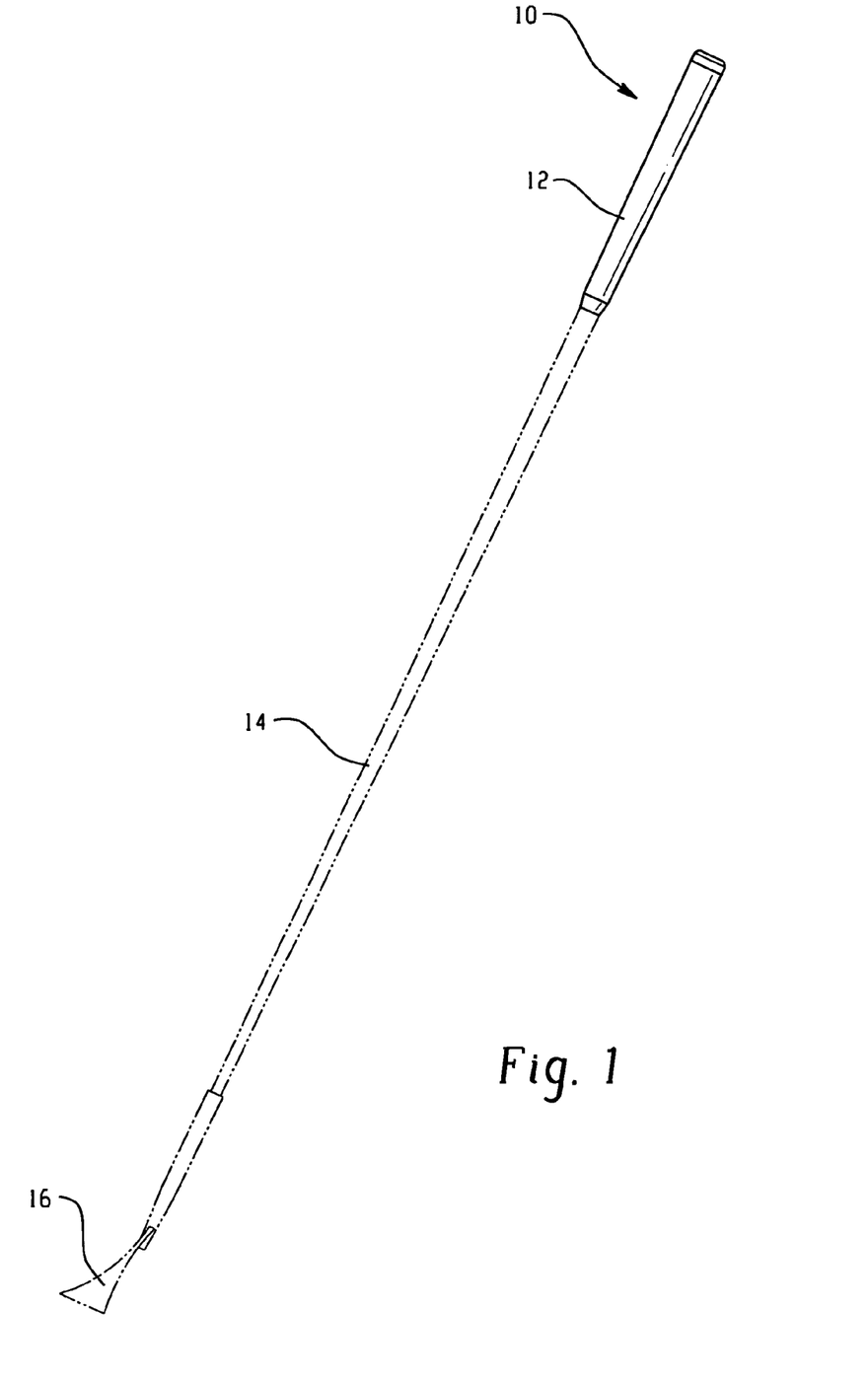
FIG. 1 is an elevated perspective view of a golf club.

Referring to the figures, which are not intended to limit the present disclosure and where like numerals designate like or similar features throughout the several views, and first in particular to FIG. 1, there is shown a golf club generally designated 10. Golf club 10 includes a golf club grip 12, a shaft or handle 14, and a club head 16, and is one example of a shock imparting implement. The term "shock imparting implement" as used herein is meant to include sporting implements and tools that are used to strike, impact, or apply a force to an object or an implement, or conversely receive an impact or force from the implement. Tennis racquets, squash racquets, racquetball racquets, lacrosse grips, fishing rod handles, bicycle handles, motorcycle handles, and baseball grips are but only a few examples meant to be included in the term "shock imparting implements". Naturally there are many others, and even possibly more sport items that may still be developed that are envisionable within the scope of the present disclosure. The term "shock imparting implements" is also meant to include but not be limited to tool handles such as a hammer handle or a screwdriver handle.

Figure 2:
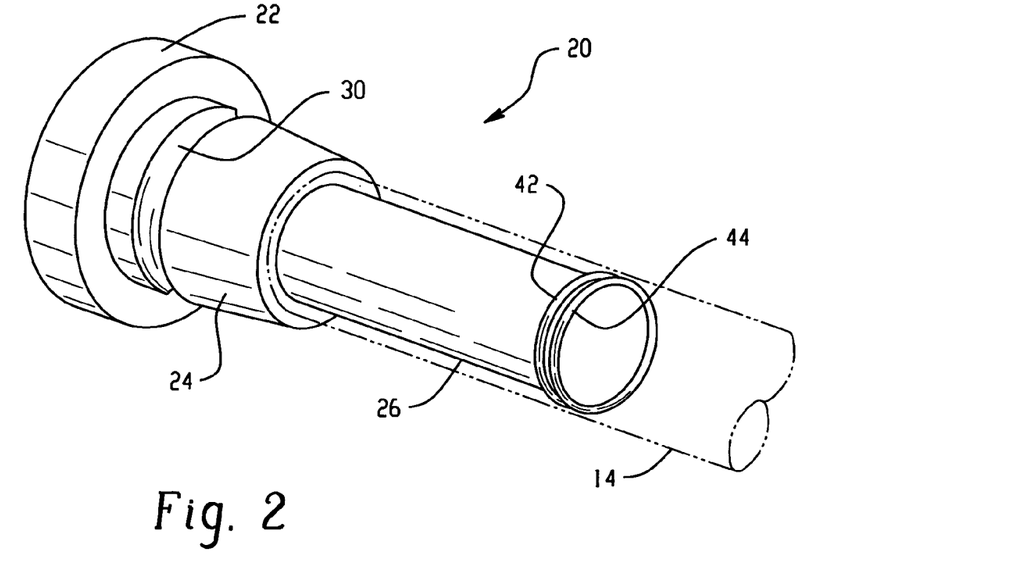
FIG. 2 is an elevated perspective view of an improved cap according to one embodiment of the present disclosure.
Figure 3:
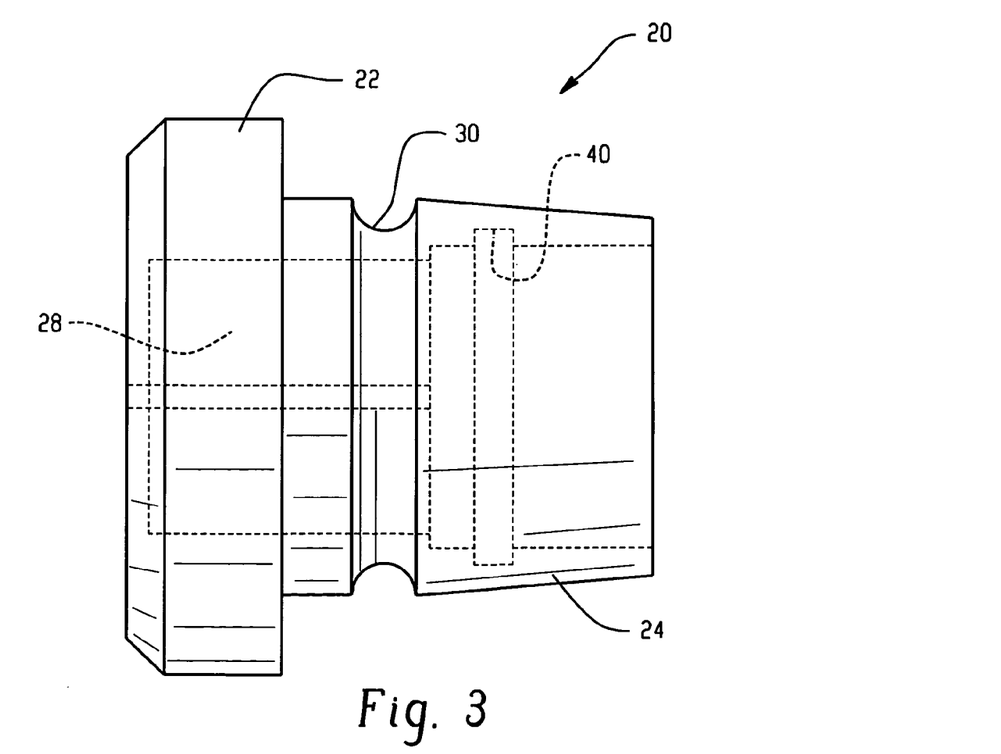
FIG. 3 is an elevated view of an improved cap according to another embodiment of the present disclosure.
Figure 4:
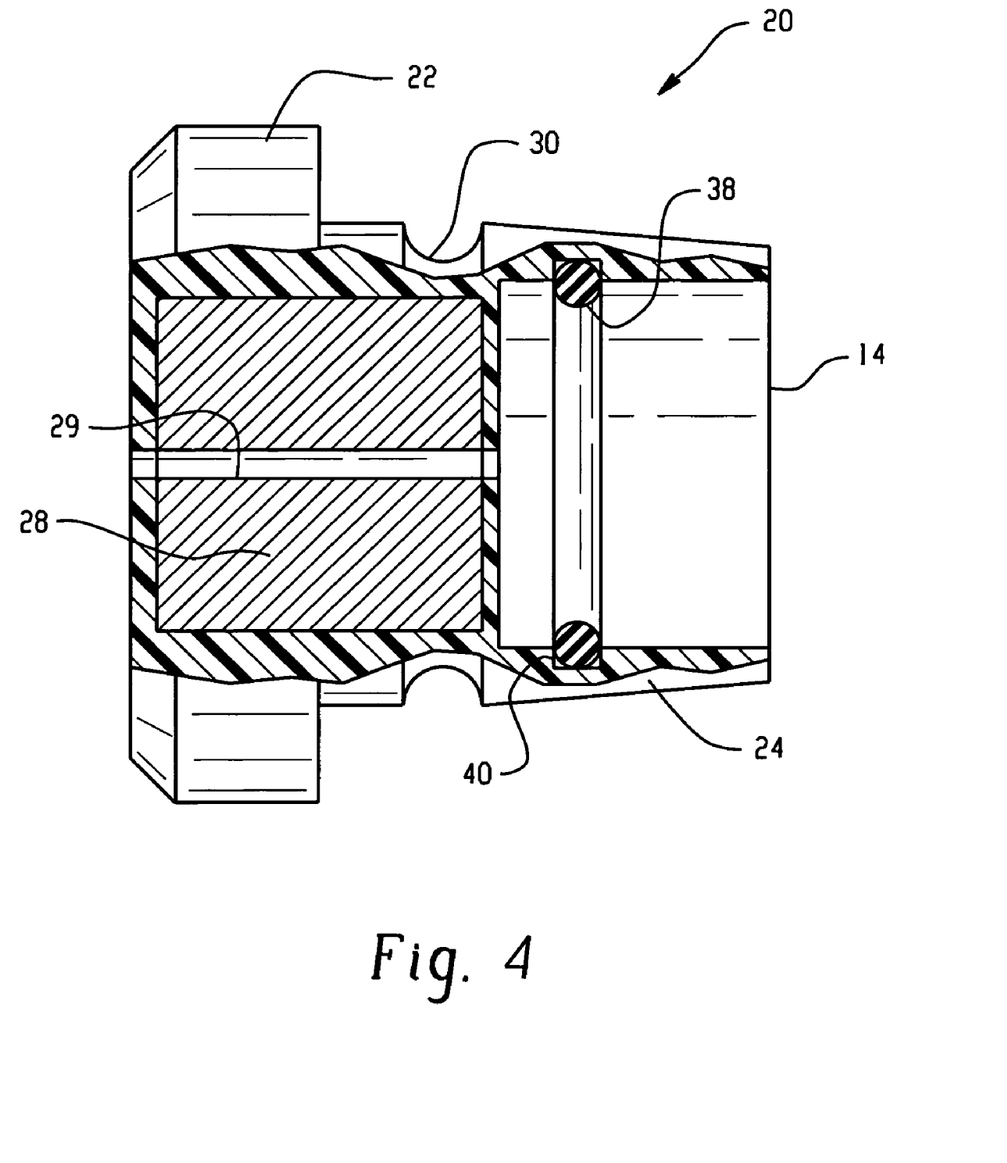
FIG. 4 is a partial sectional view of the embodiment shown in FIG. 3.
Figure 8:
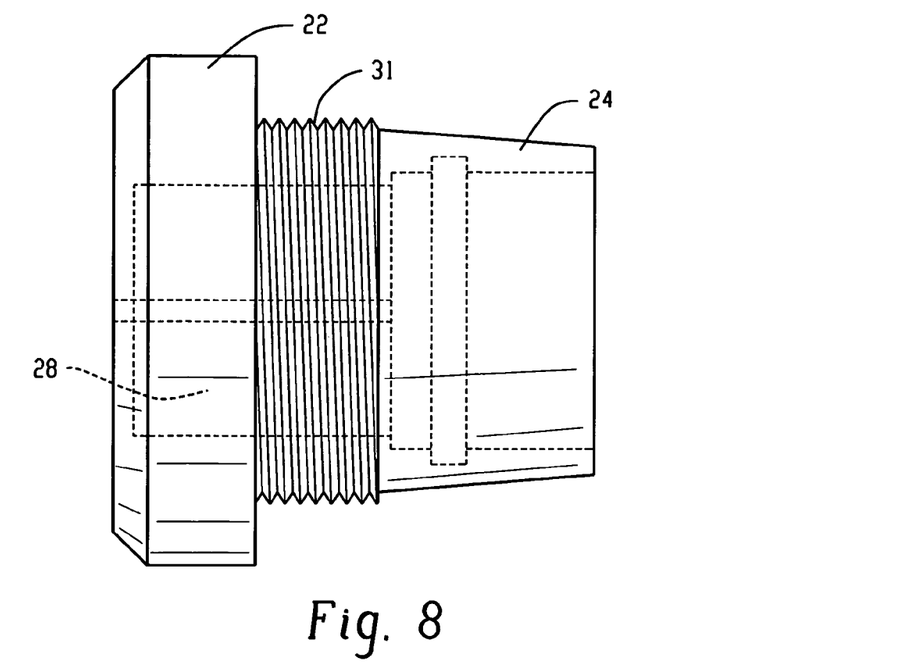
FIG. 8 is a view similar to FIG. 3 but of another embodiment.

Returning to FIG. 1, golf club grip 10 is what is known in the art as a slip-on style golf club grip. The term "slip-on" as employed herein is intended to refer to a grip that is designed to slide onto a handle or shaft 12 and be secured thereto. The grip slides onto a golf club shaft or handle and is secured thereon by an adhesive, tape, or combination thereof. The manner in which these grips are made and held in place on a golf club shaft are well known in the art and require no further explanation here. It is known in the art that slip-on golf club grips are available in many shapes, forms, and materials widely used in the industry. Current golf club grips are made of an elastomeric material like a rubber compound, a synthetic plastic or rubber, thermoplastic material, and can contain fibers or cords imbedded therein. Even though the present disclosure is particularly suited for use as a golf club grip, and described for that purpose, the present disclosure is not intended to be limited simply to golf grips as mentioned previously, and may be used for many other types of hand grips for shock imparting implements Referring next to FIG. 2, there is shown an improved design for a cap generally designated 20 for a variable mass grip according to the present disclosure. Cap 20 has a butt element 22 at one end also referred to as the butt end for the grip. Butt element 22 forms the upper portion of cap 20. Butt element 22 is preferably a substantially cylindrical element in shape, but it is envisionable that the butt element 22 can have other forms including but not limited to oval, hexagonal, octagonal, square, or various other shapes used for grips. Cap 20 further includes a tubular portion 24 connected to one side of the butt element 22 that forms a lower portion of the cap 20. The tubular portion 24 tapers towards the club head 16 in a direction away from the butt element 22. Tubular portion 24 is hollow and in one embodiment has a diameter that decreases away from the butt element 22. It should be understood that tubular portion 24 may be made up of more than one diameter in other embodiments. At least a first annular groove 30 is positioned on an outer surface of the tubular portion 24 near the butt element 22. Other embodiments provide a plurality of annular grooves 30. In still another embodiment as shown in FIG. 8, tubular portion 24 may be threaded with the threaded male portion 31 being adjacent the butt element 22 and extending a desired length. As seen in FIG. 2, the tubular portion 24 is constructed to receive a selected mass which can be an anti-vibration plug 26 as seen in FIG. 2, a predetermined weight 28 as seen in dashed lines in FIG. 3 or in solid line in FIG. 4, or a combination of both in a manner that will be described in greater detail later herein.

Figure 5:
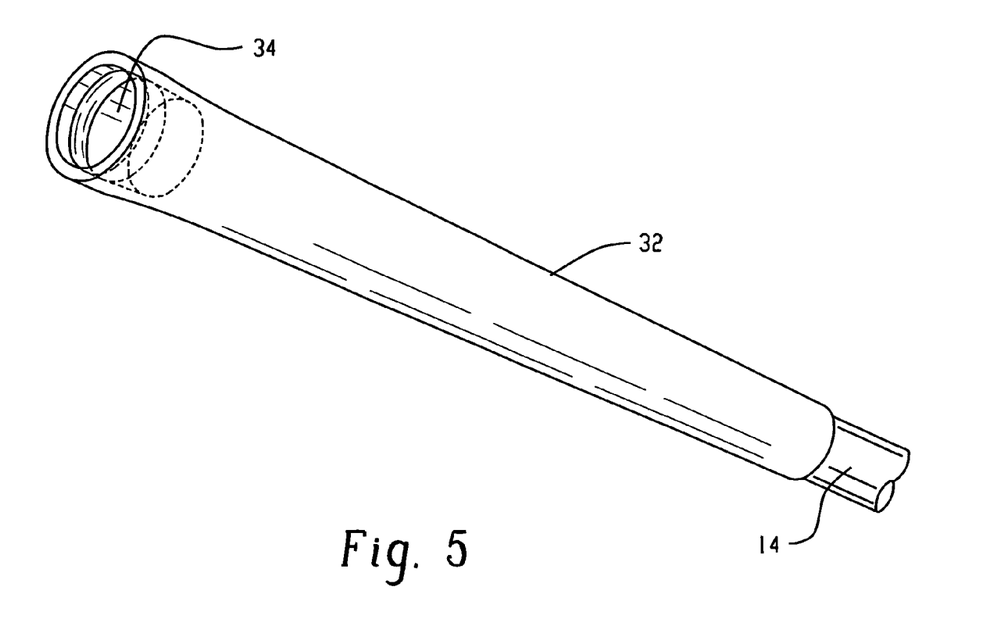
FIG. 5 is a perspective view of a hollow body for the variable mass grip according to one embodiment of the present disclosure with the cap being omitted for the sake of clarity.
Figure 6:
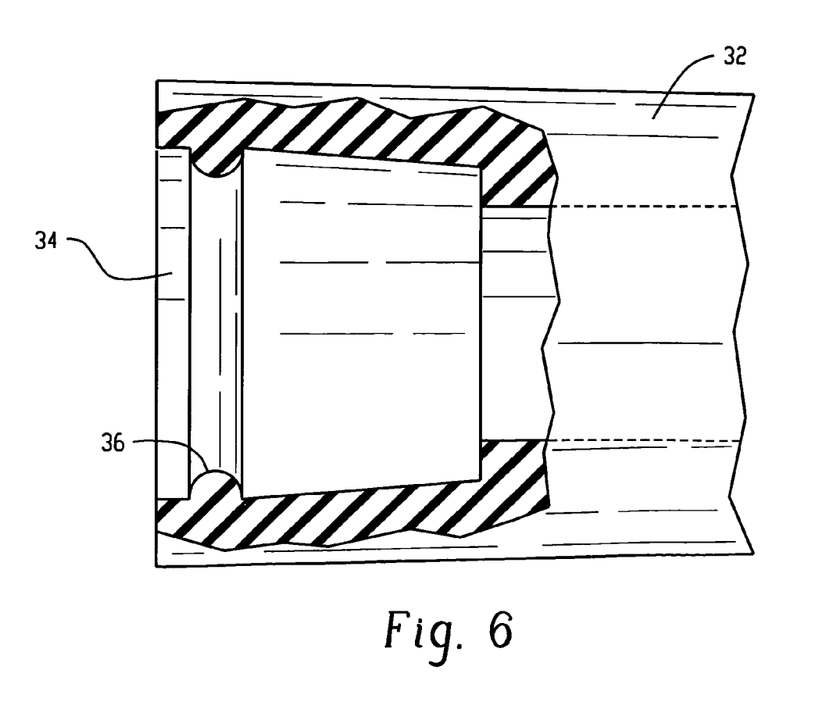
FIG. 6 is a partial sectional view of a portion of the body shown in FIG. 5.
Figure 7:
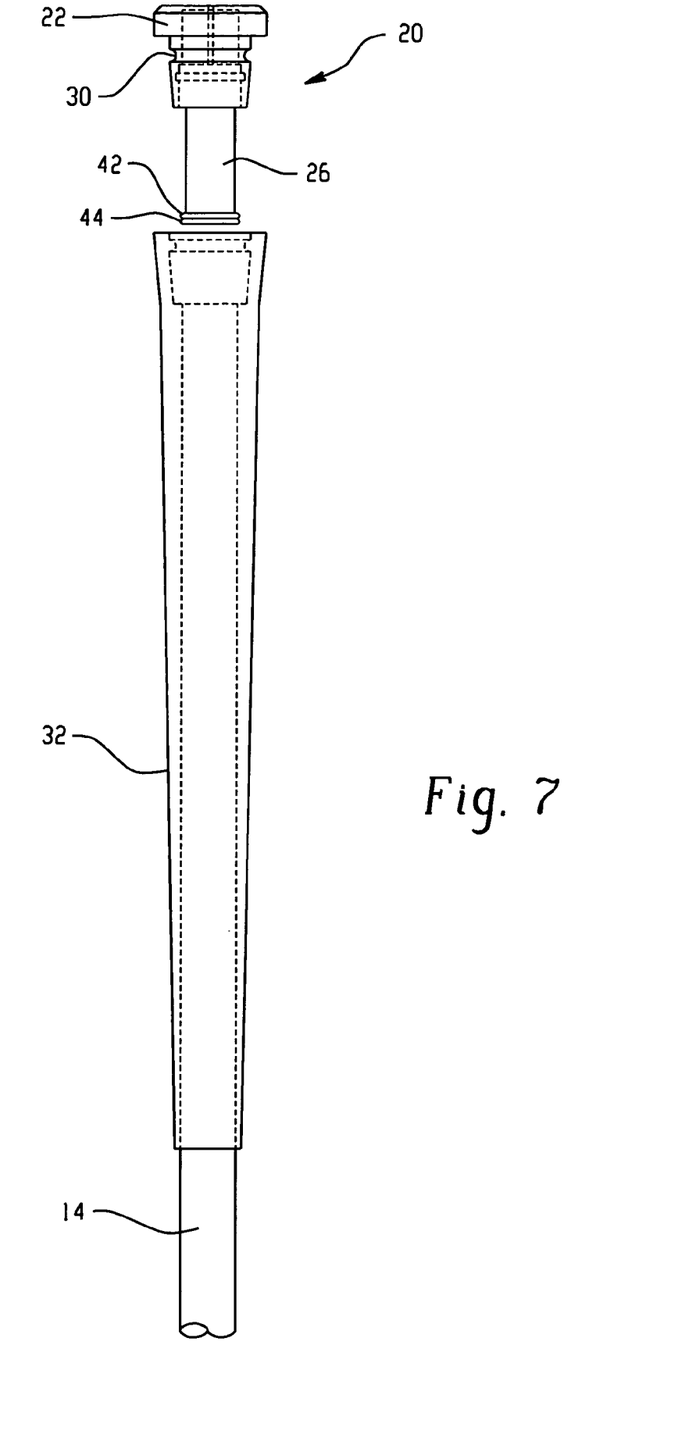
FIG. 7 is an exploded view depicting the variable mass grip according to an embodiment of the present disclosure.
Figure 9:
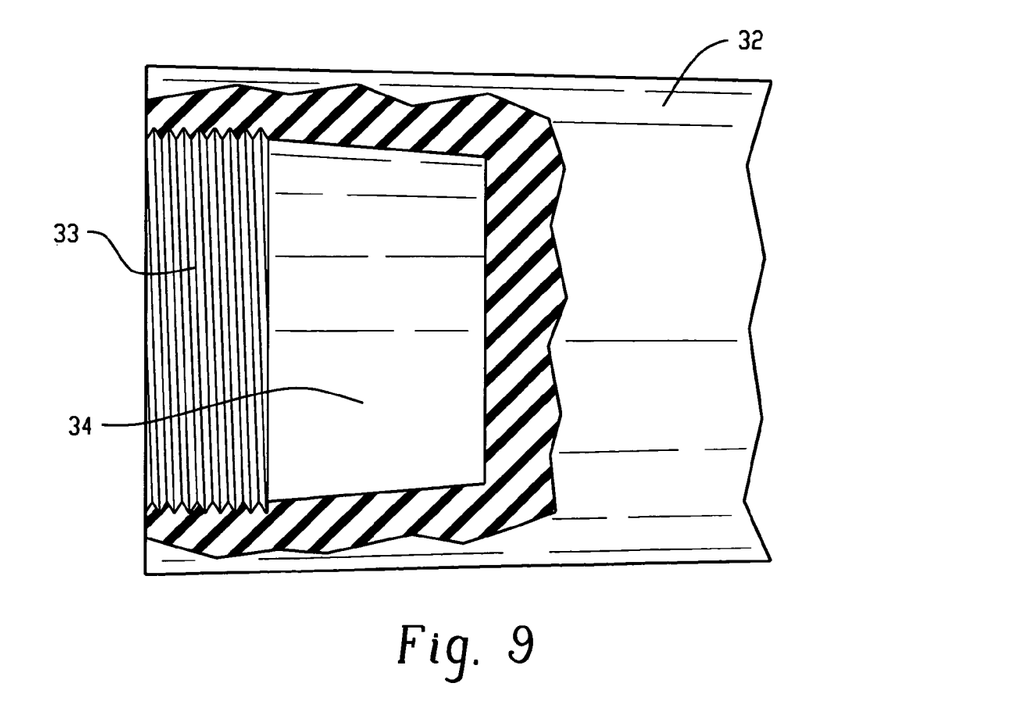
FIG. 9 is a view similar to FIG. 6 of the embodiment of FIG. 8.
Figure 10:
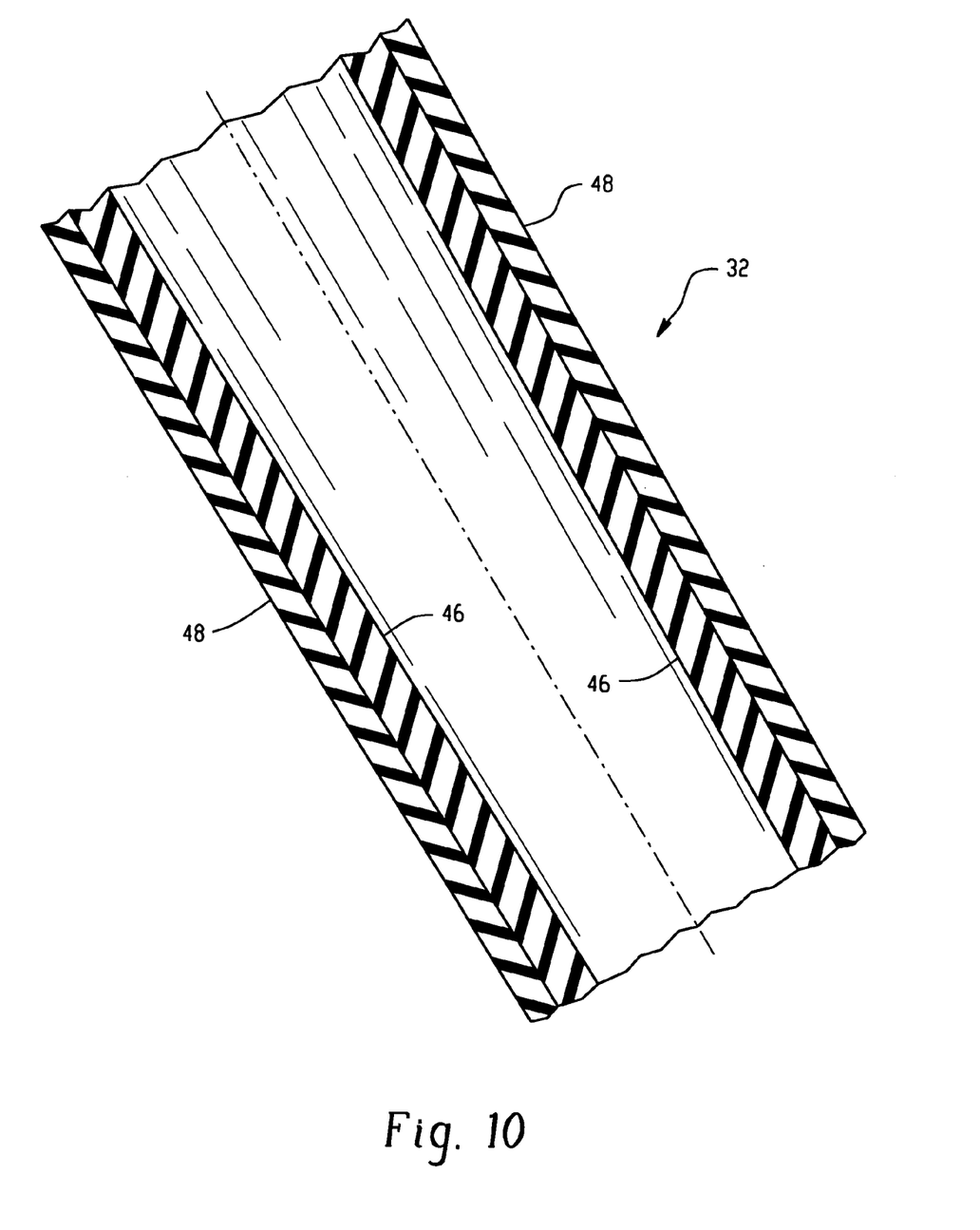
FIG. 10 is a partial sectional view depicting the outer and inner surfaces of a grip according to an embodiment of the present disclosure.

In FIGS. 5 and 6, there is shown a hollow body portion 32 that forms the remainder of the grip. Body 32 is sized to fit on one end of a shaft or handle 14. At a distal end intended to be the butt end of the grip, body 32 has a tapered recess 34 corresponding in size and shape to the tubular portion 24, and constructed to receive tubular portion 24 therein. The tubular portion 24 is adapted to fit tightly within recess 34. Recess 34 further includes at least an annular ridge 36 for engaging the first annular groove 30 mentioned above to secure the cap 20 on to the body 32 with a mechanically locking engagement. Other embodiments can include two or more ridges 36 engaging two or more annular grooves 30. In still another embodiment as shown in FIG. 9, a female threaded portion 33 may be employed instead of ridge 36 to engage the threaded male portion 31 of the alternate embodiment in the tubular portion 24 of cap 20.

Turning back to FIG. 4, weight 28 is shown positioned within cap 20 in a manner where the weight extends from the tubular portion 24 into a hollowed portion of the butt element 22. Channel 29 is provided through the center of the butt element 22 and continues through weight 28 for use in placing and holding the weight 28 during molding of the cap 20. Weight 28 is preferably a tungsten material with a weight that can range from approximately one to approximately fifteen hundred (1500) grams depending upon the user and the application. More preferably, the weight will range from approximately ten grams to approximately forty grams. The weight 28 is encapsulated within cap 20 through the molding of cap 20. An O-ring 38 engages a second annular groove 40 located on an inner surface of the tubular portion 24 near the first annular groove 30, but on an opposite side (that is the inner surface) of the tubular portion 24 for providing a secondary locking feature for the cap 20 to the shaft 14.

As mentioned previously, an advantage of the design of the improved cap 20 in the instant disclosure is the option of using an anti-vibration plug 26 as shown in FIG. 2 in conjunction with the weight 28, or alternatively alone without the weight 28. As should be immediately apparent, anti-vibration plug 26 may have its own weight contained therein if desired, and be of any length providing it fits within the hollow shaft 14. By adjusting the length of the anti-vibration plug 26, the user can select the amount of vibration dampening desired. The advantage of using the anti-vibration plug 26 with a separate weight 28 is the ability to make the anti-vibration plug 26 of more elastomeric material for absorbing shock and dampening vibration. Anti-vibration plug 26 is preferably cylindrical in form and has at least one O-ring 42, preferably two O-rings 42, 44, positioned at an opposite end away from cap 20. O-rings 42, 44 are sized to fit snugly within shaft 14 and function to dampen the vibration and absorb shock as it is transferred through wave propagation to the remainder of anti-vibration plug 26. Cap 20, body 32, and anti-vibration plug 26 along with the O-rings 38, 42, 44 are preferably manufactured of an elastomeric or thermoplastic material optimally suited for this purpose.

The body 32 can comprise one or more layers of a rubber, elastomeric or thermoplastic material, or combinations of such materials in an arrangement that provides varying durometer values. A durometer value or rating is an international standard for the hardness measurement of rubber, plastic and other non-metallic materials. Durometer values and ratings are described in the American Society for Testing and Material specification ASTM D2240. For example in one embodiment, an inner surface 46 of the body 32 that fits securely on the shaft 14 has a hardness value ranging from approximately 25 to approximately 50 Shore A hardness. The outer surface 48 of body 32 can have a durometer value preferably ranging from approximately 25 to approximately 90 Shore A, or any combination of values for providing an outer surface grip feel with good frictional qualities and tactile feel coupled with a firmer inner section.

Replacement golf grips are quite common in the golfing industry and the procedure for replacing golf grips is well known. The improved cap 20 and body 32 of the present disclosure allows the user to select the optimum weight, anti-vibration plug, and the total mass for a given application. The ability to remove and replace the cap 20 to add more or less weight, more or less anti-vibration plug, or both allows for ease in making adjustments even after the body 32 is secured on the shaft 14. This flexibility allows the user to tune the implement to their particular feel. Advantageously, body 32 can be placed on the shaft 14 in the known manner for grip replacement, or alternatively the cap 20 and body 32, as a unitary grip, can be placed on the shaft 14 first, and then later if desired cap 20 may be replaced. If the grip does not have the proper feel, the user has the option to change caps even after the grip has been installed on the shaft.

As a result, the amount of inventory is greatly reduced due to the an interchangeable cap 20 with body 32, and the manufacturing costs are significantly reduced as well since there is a smaller inventory.

While specific embodiments of the invention have been shown and described in detail to illustrate the application of the principles of the invention, it will be understood that the invention may be embodied otherwise without departing from such principles.

We claim:

1. An improved golf club grip cap, comprising:

a butt element forming an upper portion of said cap; and a tubular portion connected to one side of said butt element, said tubular portion having a diameter decreasing in a direction away from said butt element, said tubular portion having a threaded portion disposed on a outer surface thereof near said butt element, said tubular portion further including an annular groove situated on an inner surface of said tubular portion near said butt element, said tubular portion being constructed for insertion into a body of a grip and for receiving a selected mass.

2. An improved golf club grip cap according to claim 1, further comprising a selected mass disposed within at least said tubular portion.

3. An improved golf club grip cap according to claim 2, wherein said selected mass includes a weight ranging from approximately 1 gram to approximately 1500 grams.

4. A variable mass golf club grip, comprising:

a butt element forming an upper portion of a cap;

a tubular portion connected to one side of said butt element for forming a lower portion of said cap, said tubular portion having a diameter decreasing in a direction away from said butt element, said tubular portion having a threaded portion disposed on a outer surface thereof near said butt element, said tubular portion further including a annular groove situated on an inner surface of said tubular portion near said threaded portion;

a selected mass disposed within at least said tubular portion; and a hollow body constructed for positioning on a handle of a shock imparting implement, said body having at least an inner and an outer surface with said inner surface of said body being adapted to receive the handle of the shock imparting implement, a distal end on the inner surface of said body including a recess with a female threaded portion therein, said recess being constructed to receive said tubular portion of said cap, said female threaded portion being constructed for engagement with said threaded portion on said tubular portion for mechanically securing said cap to said hollow body.

5. A variable mass golf club grip according to claim 4, wherein said selected mass comprises a weight disposed within said tubular portion and a portion of said butt element of said cap, and an anti-vibration plug disposed within said tubular portion of said cap.

* * * * *